(12) United States Patent
Tseng

(10) Patent No.: US 9,897,492 B2
(45) Date of Patent: Feb. 20, 2018

(54) METHOD FOR MANUFACTURING TEMPERATURE MEASURE UNITS OF THERMOMETERS

(71) Applicant: K-JUMP HEALTH CO., LTD., New Taipei (TW)

(72) Inventor: Chao-Man Tseng, New Taipei (TW)

(73) Assignee: K-JUMP HEALTH CO., LTD., New Taipei (TW)

(*) Notice: Subject to any disclaimer, the term of this patent is extended or adjusted under 35 U.S.C. 154(b) by 246 days.

(21) Appl. No.: 14/705,502

(22) Filed: May 6, 2015

(65) Prior Publication Data

US 2016/0327435 A1    Nov. 10, 2016

(51) Int. Cl.
*G01K 11/28* (2006.01)
*G01K 7/22* (2006.01)
*G01K 1/16* (2006.01)

(52) U.S. Cl.
CPC ........ *G01K 7/22* (2013.01); *G01K 1/16* (2013.01)

(58) Field of Classification Search
CPC ............ A47J 31/401; G01K 1/16; G01K 7/22
See application file for complete search history.

(56) References Cited

U.S. PATENT DOCUMENTS

| 4,347,854 A * | 9/1982 | Gosline ............... A61B 5/01 374/166 |
| 5,755,027 A * | 5/1998 | Impey ............... H05K 1/119 174/250 |
| 5,761,804 A * | 6/1998 | Adachi .............. H05K 7/005 264/272.11 |
| 6,056,908 A * | 5/2000 | Petrosky ........... F16H 59/105 137/884 |
| 6,068,399 A * | 5/2000 | Tseng ............... G01K 13/002 374/163 |
| 8,292,495 B2 * | 10/2012 | Bieberich ........ G01K 13/002 374/1 |
| 2014/0297215 A1 * | 10/2014 | Meyerson ............. G01K 1/02 702/133 |
| 2016/0327435 A1 * | 11/2016 | Tseng ................. G01K 1/16 |

FOREIGN PATENT DOCUMENTS

TW          567054       12/2003

\* cited by examiner

*Primary Examiner* — Minh Trinh
(74) *Attorney, Agent, or Firm* — Muncy, Geissler, Olds & Lowe, P.C.

(57) ABSTRACT

A method for manufacturing a temperature measure unit of a thermometer to measure an object temperature and convert to an electric signal through the temperature measure unit that is sent to a central processing unit located in the thermometer to be processed and converted to an information obtainable by users through an output unit located in the thermometer, the method includes: providing a substrate with surfaces attached a first transmission circuit and a second transmission circuit in a spaced manner; providing a thermistor chip positioned against the substrate such that one side of the thermistor chip forms electric connection with the first transmission circuit and an opposite side forms electric connection with the second transmission circuit; and providing a transmission plate with desired electric conductivity and thermal conductivity to achieve thermal transfer and electric connection between the thermistor chip and the second transmission circuit.

3 Claims, 10 Drawing Sheets

METHOD FOR MANUFACTURING TEMPERATURE MEASURE UNITS OF THERMOMETERS

FIELD OF THE INVENTION

The present invention relates to an electronic thermometer (thermometer in short hereinafter) and particularly to a method for manufacturing temperature measure units of thermometers.

BACKGROUND OF THE INVENTION

Thermometer has many advantageous characteristics such as brittle resistant, pollution-free, more accurate measurement and shorter measurement time, hence has gradually replaced the high-contaminated mercury thermometer. In recent years constant advance of technology and higher living standard of the general public make the thermometer a trusted goods among users, hence it also becomes an essential healthcare and medical gadget in public medical institutions such as hospitals or ordinary houses.

Prior techniques for making the thermometer, such as Taiwan Patent No. 567054 entitled "Assembly method and structure of electronic thermometer" and its FIGS. 3, 7 through 9, 11 and 13 indicate that it has a thermistor chip to form electric connection with a distal end connector through welding two wires (usually a Dumet Wire formed by wrapping a copper wire with a nickel iron alloy at a size of Φ0.25 mm). Namely, the conventional technique has to rely on welding to fasten the thermistor chip to the wire to achieve electric conduction. Such a technique has disadvantages in practice, such as 1. Due to the size of the thermistor chip is very small, about 0.71 mm×0.71 mm×0.3 mm, welding two different planes at such a small distance to two wires has to use precise and dedicated fixtures, fabrication facilities and production line that are specially designed; 2. The fabrication process is complicated and product defective rate is higher; 3. The thermistor chip has to convert the measured temperature to electric signals which could have deviations compared with standard value, the maximum positive and negative deviation values in the set deviation range could be very big between them, hence the general practice in the industry is classifying the thermistor chips of the deviation range close to each other to be compensated with different adjustment parameters via a central processing unit (CPU) to improve the measurement precision of the finished thermometers. In the conventional technique, after the thermistor chip has been welded to the wires, measurement is performed and an adjustment parameter is obtained and classification is done, then a connector of a suitable adjustment parameter is selected to form electric connection with the CPU, or a circuit board of a suitable adjustment parameter is selected for welding to form electric connection with the CPU. It is a complex production mode and difficult to improve productivity.

SUMMARY OF THE INVENTION

The primary object of the present invention is to solve the aforesaid disadvantages and problems of the conventional techniques by modularizing a temperature measure unit to make a thermistor chip to form electric connection in a contact fashion without welding process to facilitate production and assembly, and improve production yield. The invention also directly changes the Identification Code (ID code in short hereinafter) at the distal end of the temperature measure unit to make classification faster and form rapid electric connection with a connector to improve productivity to meet requirements of the industry.

To achieve the foregoing object the present invention provides a method for manufacturing temperature measure units of thermometers. Each thermometer measures an object temperature through a temperature measure unit and converts the temperature to an electric signal. The electric signal is sent to a CPU in the thermometer to be processed and converted to an information. The thermometer has an output unit inside to allow users to get the information. The method of the invention includes the steps of: providing a substrate which has surfaces attached a first transmission circuit and a second transmission circuit that are spaced from each other; providing a thermistor chip which is positioned against the substrate such that one side of the thermistor chip forms electric connection with the first transmission circuit and an opposite side forms electric connection with the second transmission circuit; and providing a transmission plate with desired electric conductivity and thermal conductivity to achieve thermal transmission and electric connection between the thermistor chip and the second transmission circuit.

In addition, the method of the invention also includes: providing an isolation layer with desired insulation characteristics to position the thermistor chip between the substrate and the transmission plate. The isolation layer has a positioning portion to hold the thermistor chip and at least one aperture to allow the transmission plate to form electric connection with the first transmission circuit or the second transmission circuit. The substrate also has an end surface with an electric signal ID code connection end formed thereon by extending the first transmission circuit or the second transmission circuit to classify temperature measurement deviation values of the thermistor chip.

To achieve the foregoing object the present invention provides a method for manufacturing temperature measure units of thermometers. Each thermometer measures an object temperature through a temperature measure unit and converts the temperature to an electric signal. The electric signal is sent to a CPU in the thermometer to be processed and converted to an information. The thermometer has an output unit inside to allow users to get the information. The method of the invention includes the steps of: providing two substrates which have surfaces attached a first transmission circuit and a second transmission circuit; providing a thermistor chip between the two substrates for positioning with one side of the thermistor chip formed electric connection with the first transmission circuit and an opposite side formed electric connection with the second transmission circuit; and providing a transmission plate with a desired thermal conductivity in contact with the thermistor chip so that the thermistor chip can measure the object temperature and transmission heat via the transmission plate.

In addition, the method of the invention also includes: providing an isolation layer with desired insulation characteristics to position the thermistor chip between the two substrates. The isolation layer has a positioning portion to hold the thermistor chip. The substrates also have an end surface with an electric signal ID code connection end formed thereon by extending the first transmission circuit or the second transmission circuit to classify temperature measurement deviation values of the thermistor chip.

To achieve the foregoing object the present invention provides a method for manufacturing temperature measure units of thermometers. Each thermometer measures an object temperature through a temperature measure unit and converts the temperature to an electric signal. The electric signal is sent to a CPU in the thermometer to be processed and converted to an information. The thermometer has an output unit inside to allow users to get the information. The method of the invention includes the steps of: providing a substrate which has surfaces attached a first transmission circuit and a second transmission circuit that are spaced from each other; providing a thermistor chip which is positioned against the substrate such that one side of the thermistor chip forms electric connection with the first transmission circuit and an opposite forms electric connection with the second transmission circuit via a Chip on Board (COB) fabrication process; and providing a transmission plate for the thermistor chip to transfer heat.

In addition, the method of the invention also includes: providing an isolation layer with desired insulation characteristics to position the thermistor chip between the substrate and the transmission plate. The substrate also has an end surface with an electric signal ID code connection end formed thereon by extending the first transmission circuit or the second transmission circuit to classify temperature measurement deviation values of the thermistor chip.

Through the techniques set forth above, compared with the conventional techniques, the invention can provide many advantages, notably: 1. Through the method of the invention the temperature measure unit can be modularized in structure to confine the thermistor chip between the substrate and the transmission plate, and form electric connection with the first transmission circuit and the second transmission circuit in a contact manner, hence can save the welding process to facilitate assembly and also improve production yield of the products; 2. By directly change the ID code of the electric signal ID code connection end at the distal end of the temperature measure unit (such as remove at least one of the connection ends to form the ID code), classification can be accomplished quickly, and electric connection with the electric connector also can be done rapidly to transmit the electric signal to the CPU of a corresponding ID code, thereby can improve productivity to meet industry requirements.

The foregoing, as well as additional objects, features and advantages of the invention will be more readily apparent from the following embodiments and detailed description, which proceed with reference to the accompanying drawings.

DETAILED DESCRIPTION OF THE PREFERRED EMBODIMENTS

Figure 1:
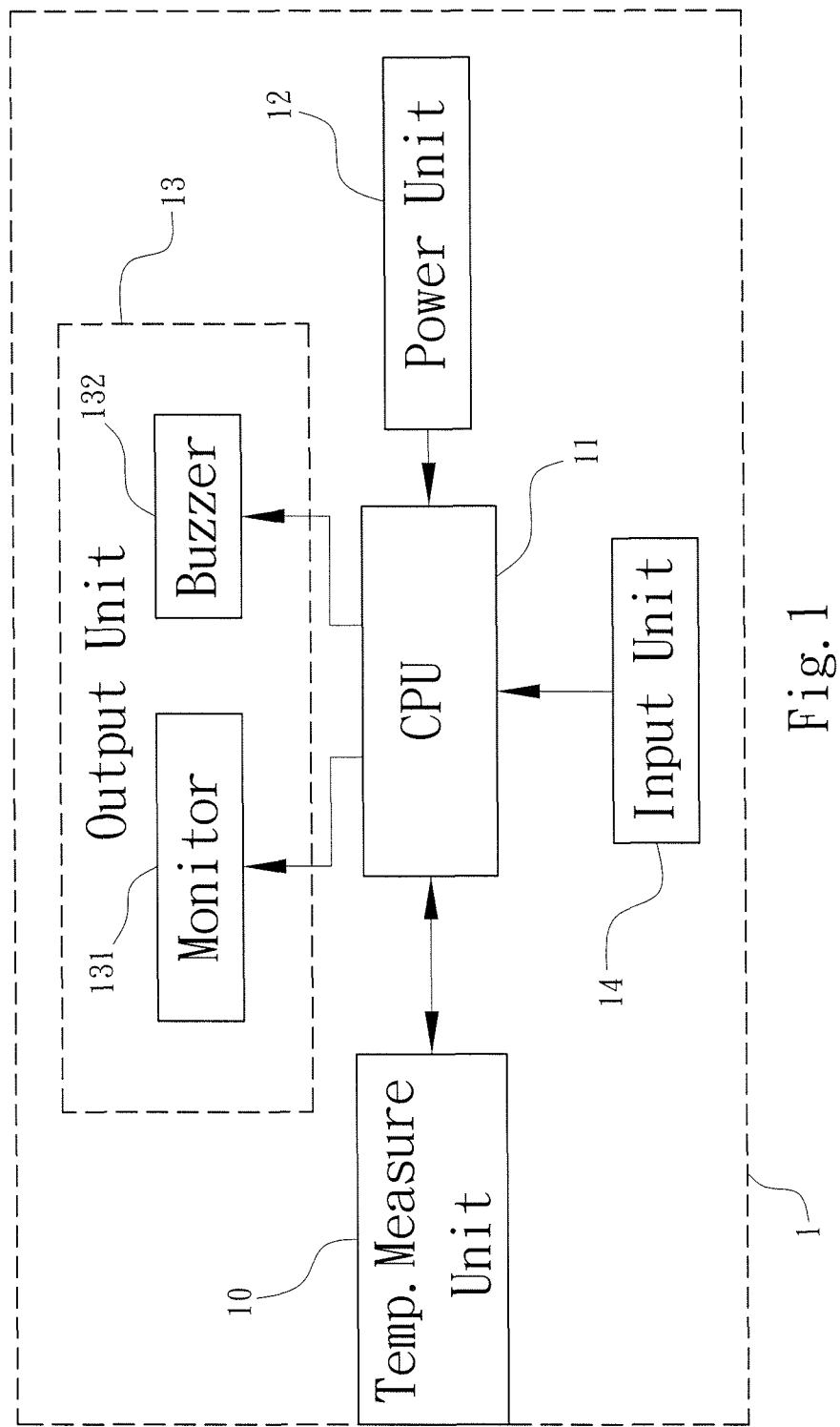
FIG. 1 is a circuit block diagram of an embodiment of the thermometer of the invention.
Figure 2:
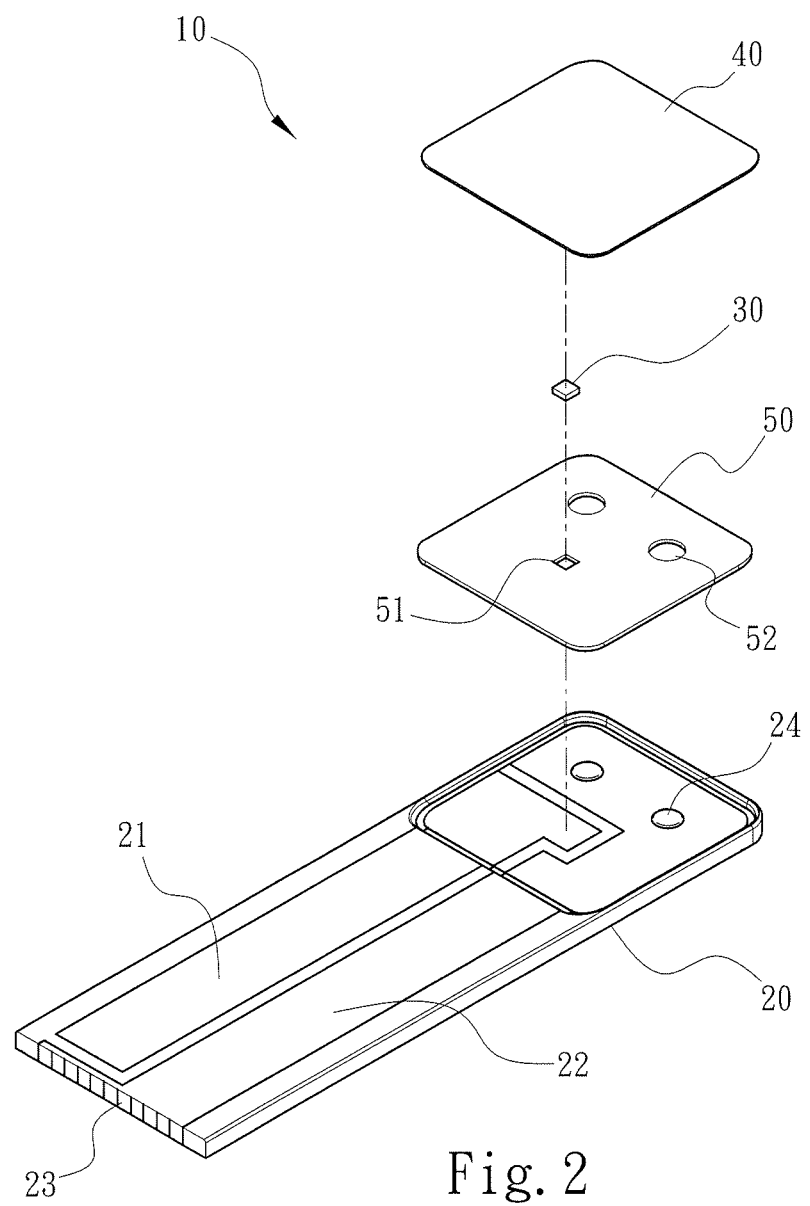
FIG. 2 is an exploded view of a first embodiment of the temperature measure unit of the invention.
Figure 3:
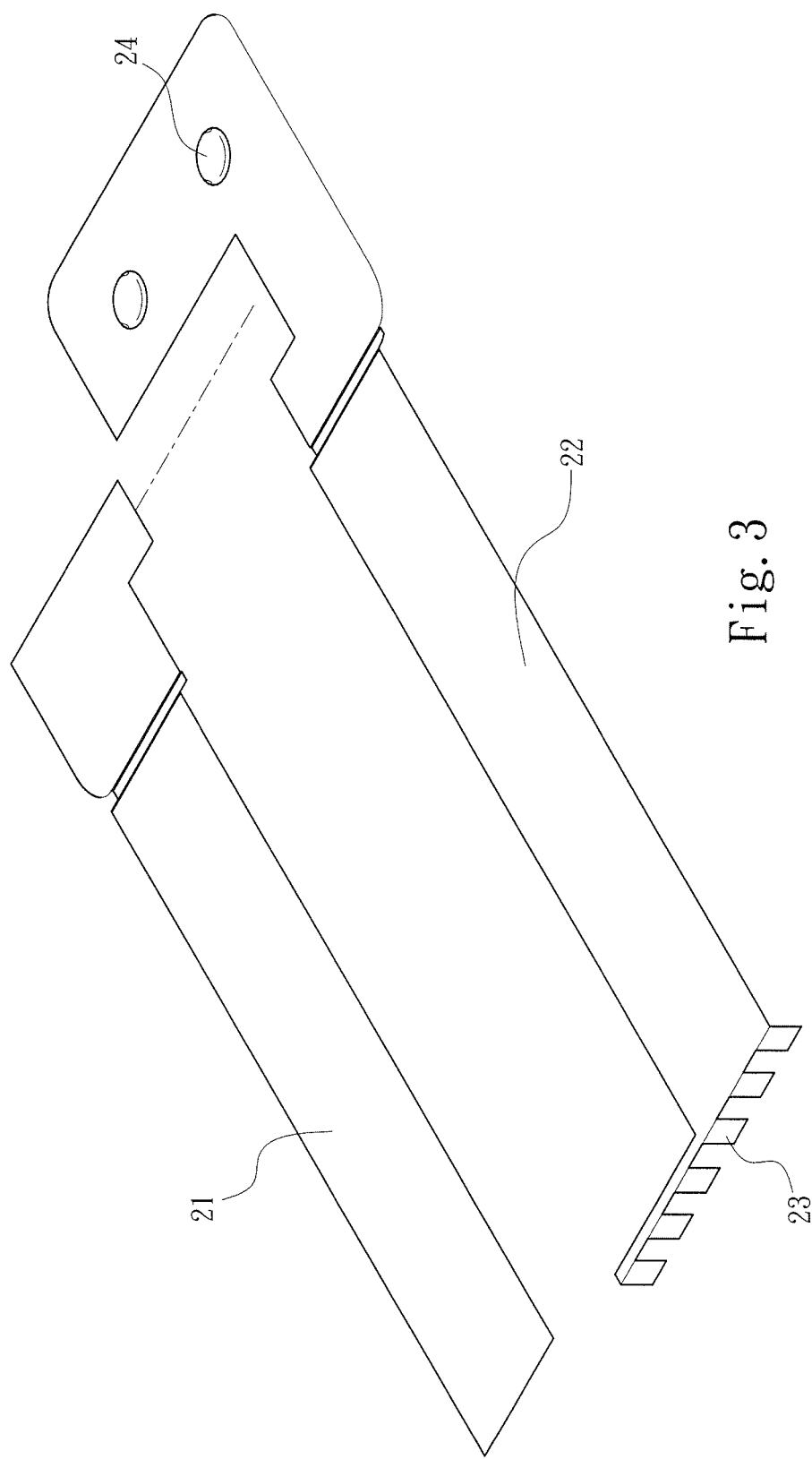
FIG. 3 is a fragmentary schematic view of a first transmission circuit and a second transmission circuit according to FIG. 2.
Figure 4:
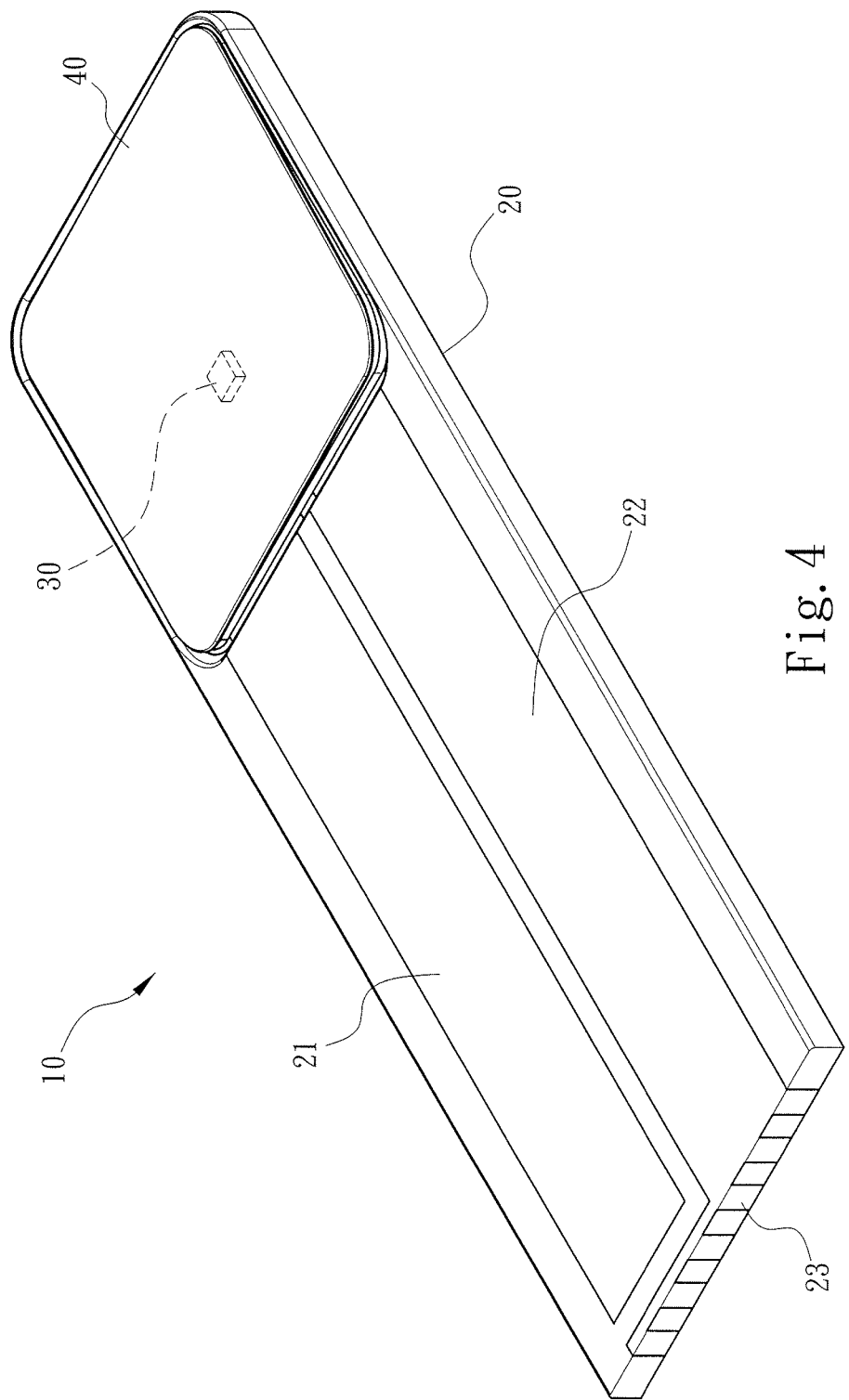
FIG. 4 is a perspective view of an assembly according to FIG. 2.
Figure 5:
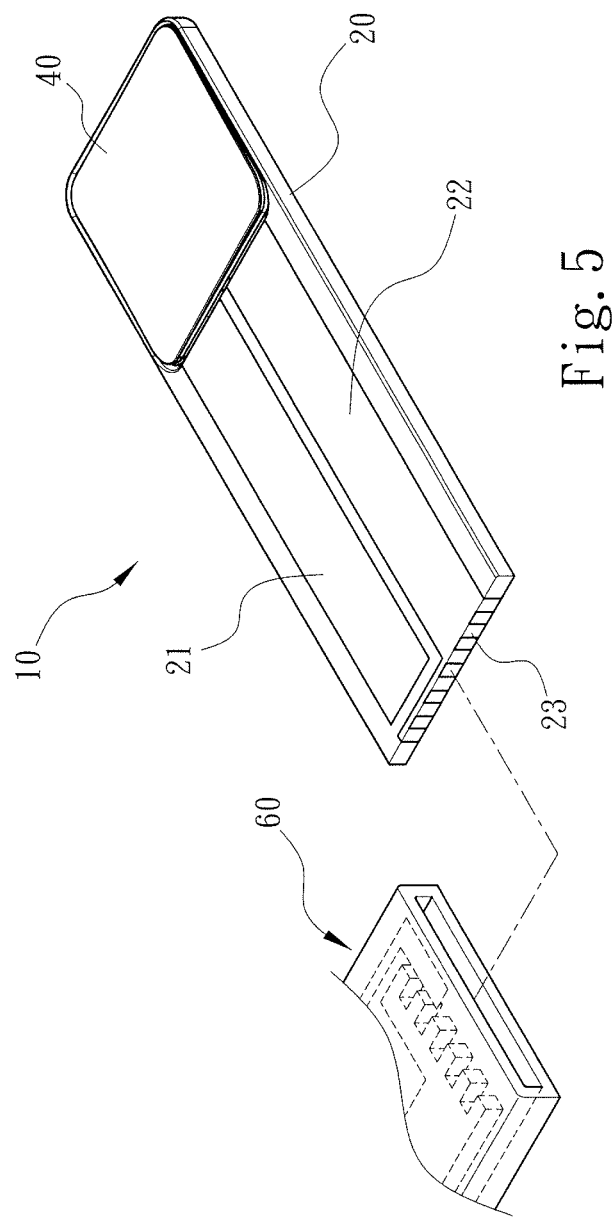
FIG. 5 is a perspective view of FIG. 4 against an electric connector.

Please refer to FIGS. 1 through 4 for a first embodiment of the temperature measure unit of the invention. The invention aims to provide a method for manufacturing a temperature measure unit 10 of a thermometer 1. The temperature measure unit 10 aims to measure an object temperature and convert to an electric signal sent to a CPU 11 located in the thermometer 1 for processing and conversion to an information to be obtained by users via an output unit 13 (such as a monitor 131, a buzzer 132 or the like) located in the thermometer 1. The thermometer 1 also can provide an input unit 14 (for setting time, function or restart etc.) as shown in FIG. 1. Electric power required by all the elements in the thermometer 1 can be supplied by a power unit 12 (such as a battery or external power). The method of the invention includes the steps of: providing a substrate 20 which surfaces attached a first transmission circuit 21 and a second transmission circuit 22 that are spaced from each other; providing a thermistor chip 30 which is positioned against the substrate 20 such that one side of the thermistor chip 30 forms electric connection with the first transmission circuit 21 and an opposite side forms electric connection with the second transmission circuit 22; and providing a transmission plate 40 with desired electric conductivity and thermal conductivity to achieve thermal transmission and electric connection between the thermistor chip 30 and the second transmission circuit 22. The method of the invention also includes: providing an isolation layer 50 with desired insulation characteristics to allow the thermistor chip 30 to be positioned between the substrate 20 and the transmission plate 40. The isolation layer 50 has a positioning portion 51 to hold the thermistor chip 30 and at least one aperture 52 to allow the transmission plate 40 to form electric connection with the first transmission circuit 21 or the second transmission circuit 22. The substrate 20 also has an end surface with an electric signal ID code connection end 23 formed thereon by extending the first transmission circuit 21 or the second transmission circuit 22 to classify temperature measurement deviation values of the thermistor chip 30. It is to be noted that through the manufacturing method previously discussed the temperature measure unit 10 is formed in a modular structure that includes the substrate 20 with the first transmission circuit 21 and the second transmission circuit 22 attached to the surfaces thereof and spaced from each other. The temperature measure unit 10 also has the thermistor chip 30 located therein that has two opposite sides to form electric connection respectively with the first transmission circuit 21 and the second transmission circuit 22. As shown in FIGS. 2, 3 and 4, the thermistor chip 30 is located between the substrate 20 and the transmission plate 40 through the isolation layer 50 which has desired insulation characteristics. The isolation layer 50 has the positioning portion 51 to hold the thermistor chip 30 and at least one aperture 52 to form electric connection between the transmission plate 40 and the second transmission circuit 22. The thermistor chip 30 is directly located on the first transmission circuit 21 to form electric connection therewith and also forms electric connection with the second transmission circuit 22 via the transmission plate 40 and two transmission bosses 24 that have desired electric conductivity and thermal conductivity. The electric signal is obtained by converting the object temperature measured by the thermistor chip 30. It is to be noted that in order to enhance contact stability between the thermistor chip 30 and the first transmission circuit 21 or the transmission plate 40 an adhesive (such as the conductive adhesive commercially called "silver paste") can be daubed as desired during implementation. Also referring to FIG. 5, in the first embodiment the distal end surface of the substrate 20 can have the electric signal ID code connection end 23 formed thereon by extending the second transmission circuit 22 (or by extending the first transmission circuit 21) to classify the temperature measurement deviation values of the thermistor chip 30. After being measured and classified by the electric signal ID code connection end 23 (this embodiment forms the ID code for classifying by removing at least one electric signal ID code connection end 23, or by daubing an insulation layer on the electric signal ID code connection end 23, other approaches also can be adopted without limited to the methods mentioned above, and also are deemed within the claims of the invention), through an electric connector 60 interposed between the CPU 11 and the temperature measure unit 10 the electric signal can be transmitted to the CPU 11. In short, the invention, by forming the temperature measure unit 10 in a modular structure can confine the thermistor chip 30 between the substrate 20 and the transmission plate 40 to form electric connection with the first transmission circuit 21 and the second transmission circuit 22 in a contact fashion, as a result, not only the welding process can be saved to facilitate fast assembly, production yield also can be improved. In addition, by directly changing the 6-piece electric signal ID code connection end 23 at the distal end of the temperature measure unit 10 to facilitate classification, electric connection with the electric connector 60 can be established quickly to send the electric signal to the CPU 11 of a corresponding ID code, hence productivity also can be increased to meet industry requirements.

Figure 6:
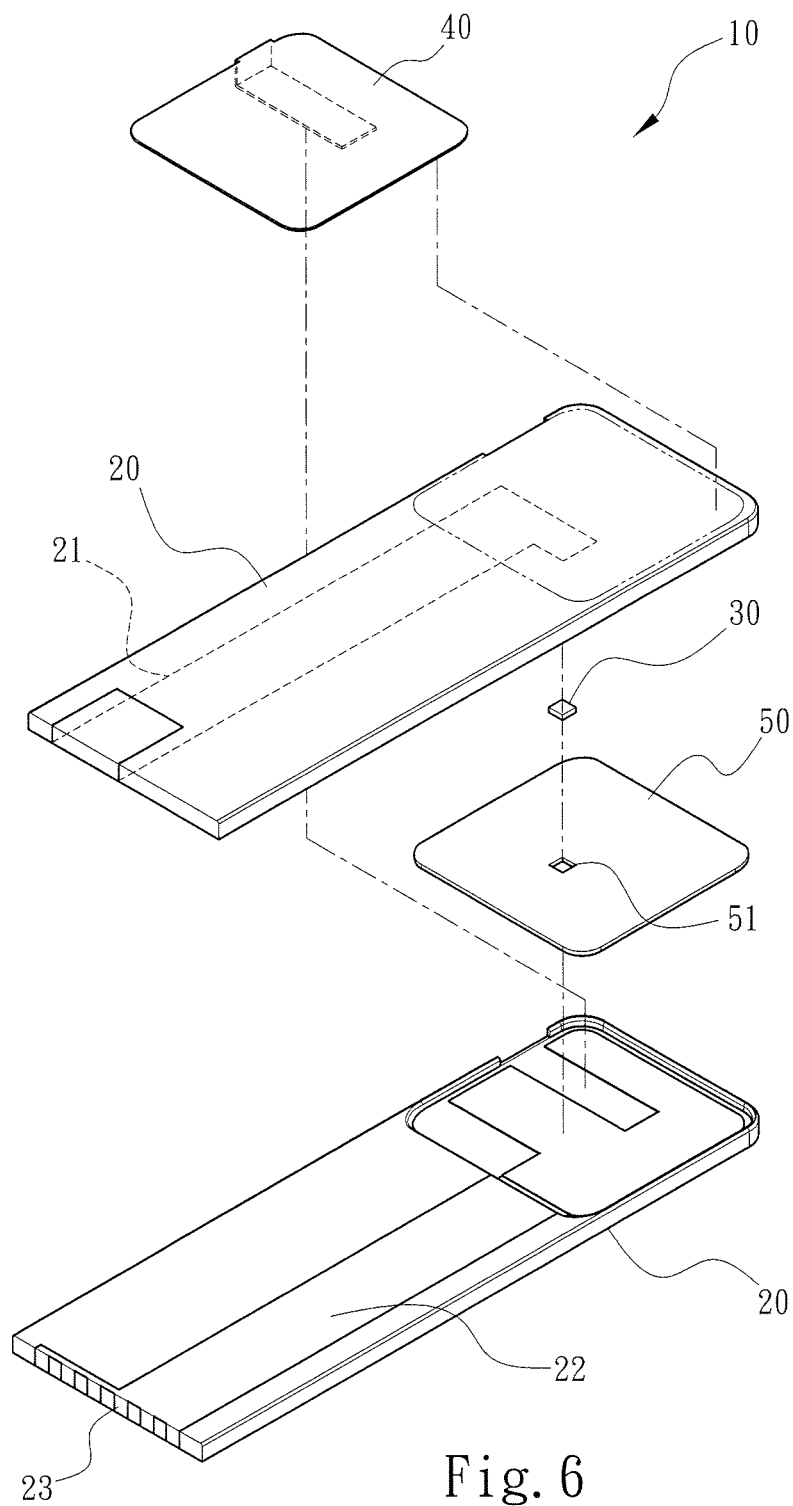
FIG. 6 is an exploded view of a second embodiment of the temperature measure unit of the invention.
Figure 7:
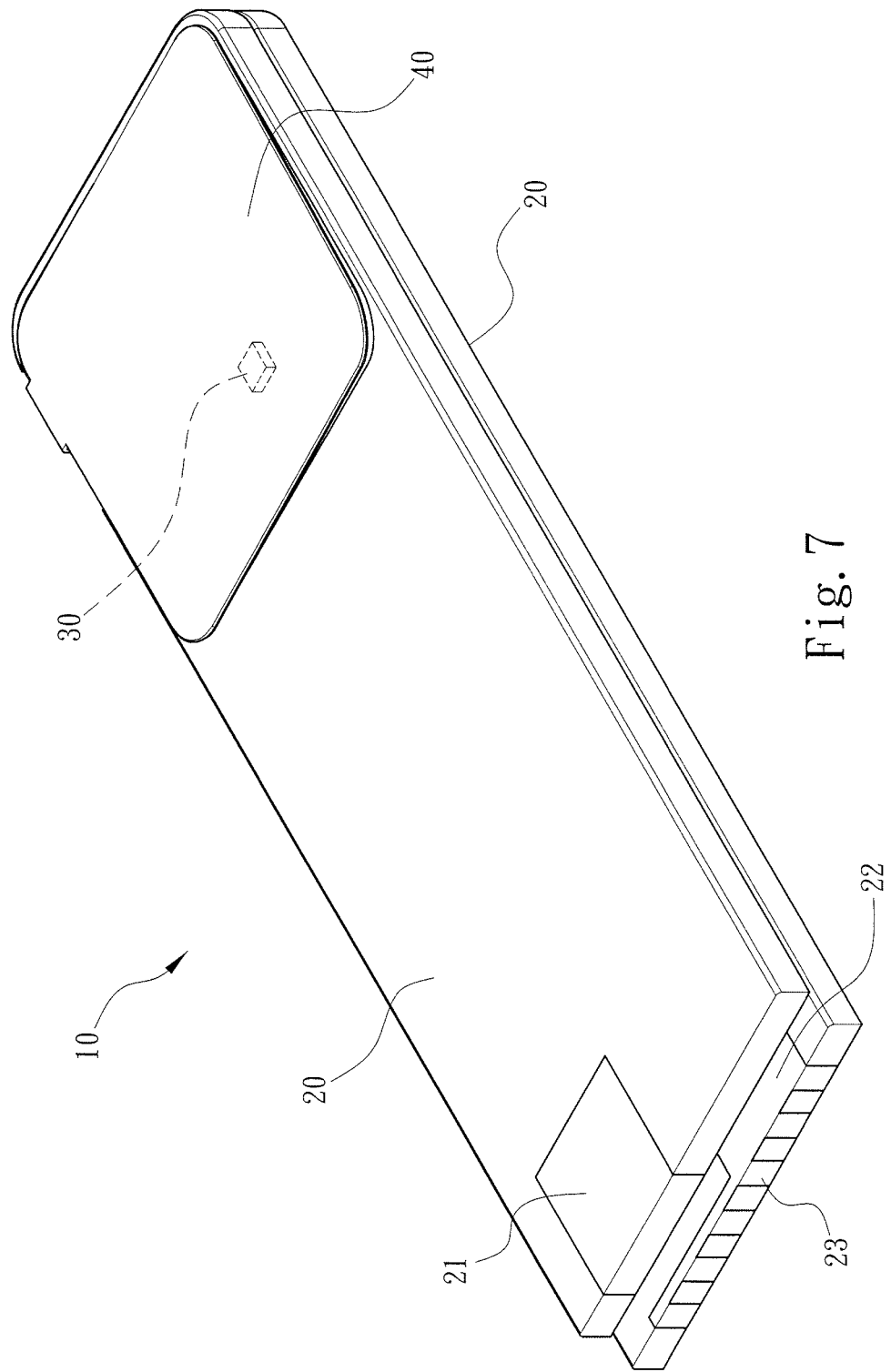
FIG. 7 is a perspective view of an assembly according to FIG. 6.
Figure 8:
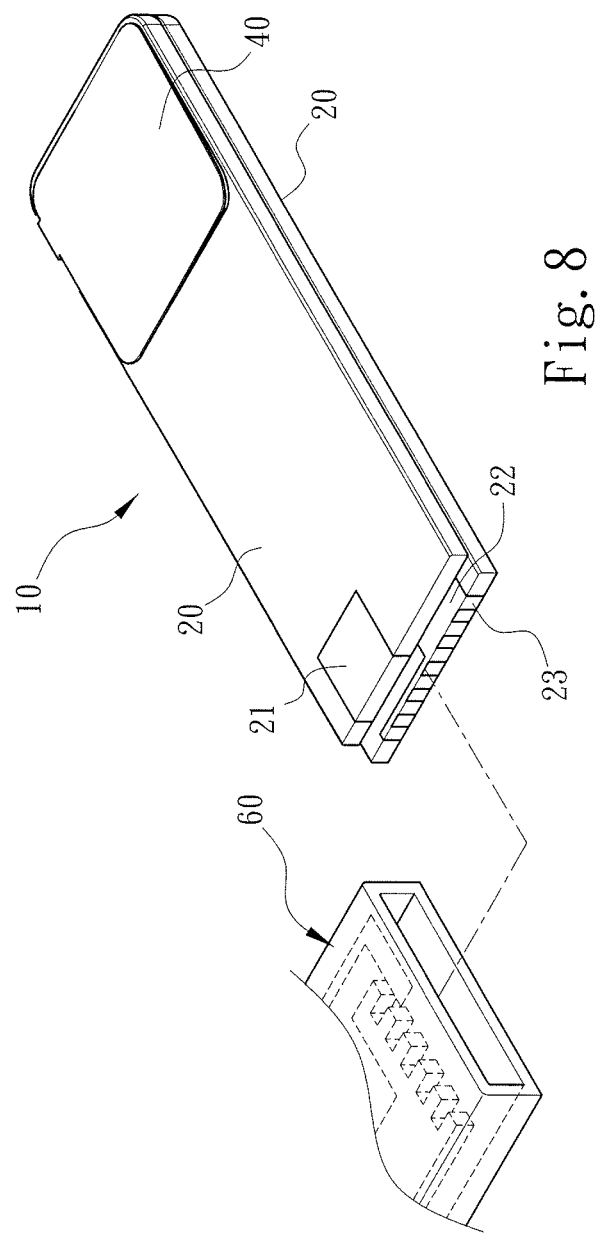
FIG. 8 is a perspective view of FIG. 7 against an electric connector.

Please refer to FIGS. 6, 7 and 8 for another embodiment of the method for manufacturing the temperature measure unit 10 of the invention. It includes: providing two substrates 20 which have surfaces attached respectively a first transmission circuit 21 and a second transmission circuit 22; providing a thermistor chip 30 between the two substrates 20 for positioning with one side of the thermistor chip 30 formed electric connection with the first transmission circuit 21 and an opposite side formed electric connection with the second transmission circuit 22; and providing a transmission plate 40 with a desired thermal conductivity in contact with the thermistor chip 30 so that the thermistor chip 30 can measure object temperature and transmit heat via the transmission plate 40. The method further provides an isolation layer 50 with desired insulation characteristics between the two substrates 20. The isolation layer 50 has a positioning portion 51 to hold the thermistor chip 30. The substrates 20 also have an end surface with an electric signal ID code connection end 23 formed thereon by extending the first transmission circuit 21 or the second transmission circuit 22 to classify temperature measurement deviation values of the thermistor chip 30. FIGS. 6 and 7 show that the second embodiment differs from the first embodiment by having two substrates 20 in the temperature measure unit 10 that have the surfaces attached respectively the first transmission circuit 21 and the second transmission circuit 22, and the temperature measure unit 10 further has the thermistor chip 30 interposed between the first transmission circuit 21 and the second transmission circuit 22 with two opposite sides formed electric connection therewith. The thermistor chip 30 can be located between the two substrates 20 via the isolation layer 50 of desired insulation characteristics. The isolation layer 50 also has a positioning portion 51 to hold the thermistor chip 30. The thermistor chip 30 can measure and transmit the object temperature through the transmission plate 40 and convert it to an electric signal thereof. It is to be noted that the transmission plate 40 is implemented by an extra addition approach, and be extended to form contact with the second transmission circuit 22. Of course, the transmission plate 40 also can be formed by extending the second transmission circuit 22. Also referring to FIG. 8, similar to the first embodiment previously discussed, the second transmission circuit 22 also can be extended to an end surface of the substrate 20 (or by extending the first transmission circuit 21) to form an electric signal ID code connection end 23 to classify the temperature measurement deviation values of the thermistor chip 30, and transmit the electric signal from the thermistor chip 30 to the CPU 11 via an electric connector 60 located between the CPU 11 and the temperature measure unit 10. It is to be noted that the electric connector 60 in the second embodiment has an opening changed to accommodate the two substrates 20 in thickness.

Figure 9:
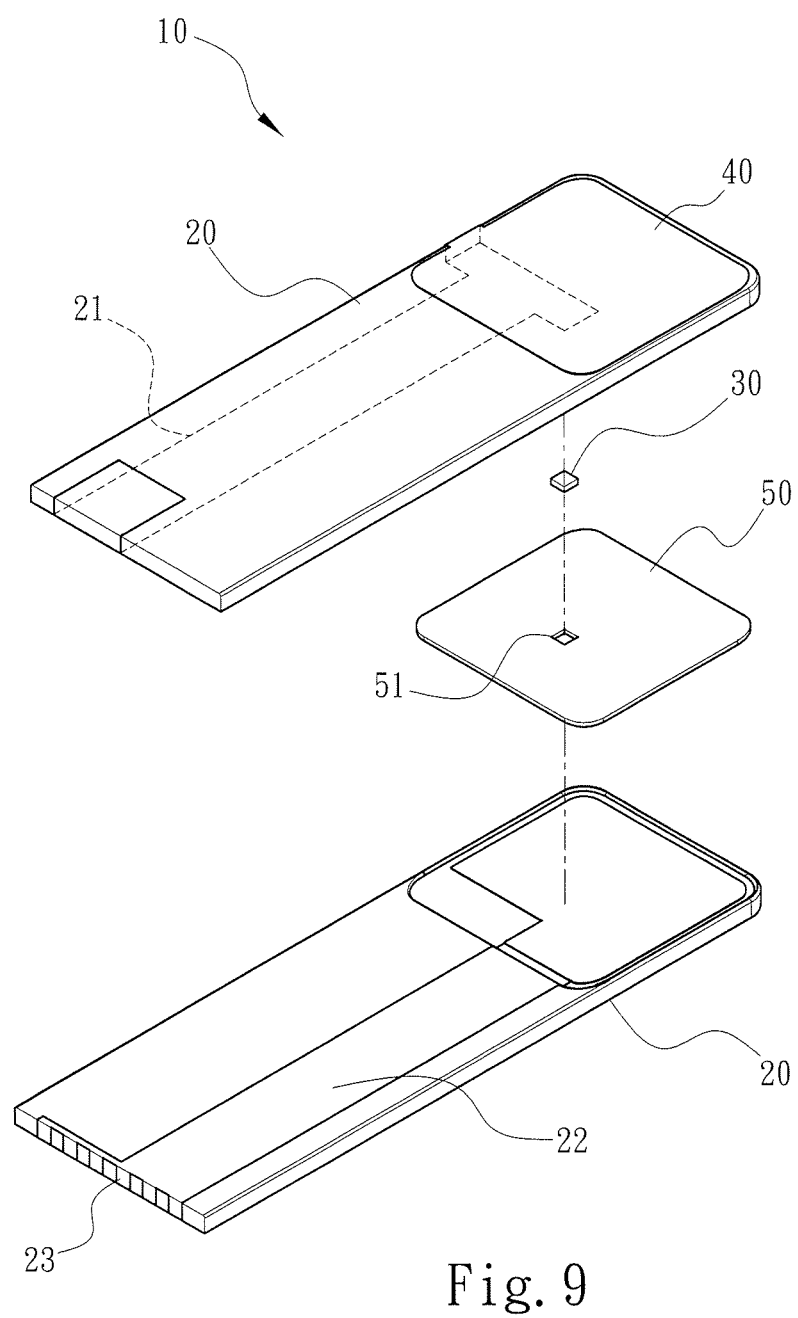
FIG. 9 is an exploded view of a third embodiment of the temperature measure unit of the invention.

Please refer to FIG. 9 for a third embodiment of the temperature measure unit of the invention. It differs from the second embodiment by directly forming the transmission plate 40 by extending the first transmission circuit 21. Of course, the transmission plate 40 also can be formed by external addition approach. Similarly, the main focus is that the transmission plate 40 must be extended to form connection with the first transmission circuit 21.

Figure 10:
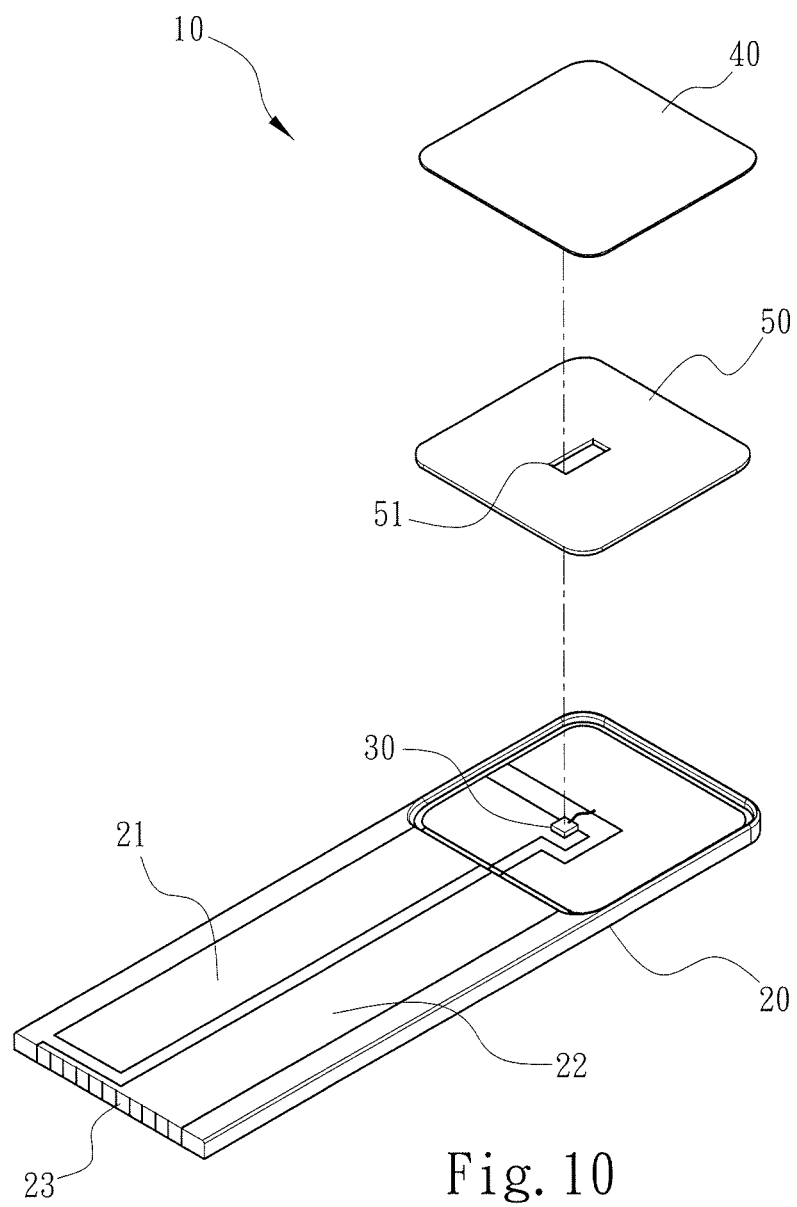
FIG. 10 is an exploded view of a fourth embodiment of the temperature measure unit of the invention.

Finally, please refer to FIG. 10 for a fourth embodiment of the temperature measure unit of the invention. It differs from the first embodiment by positioning of the thermistor chip 30 against the substrate 20, with one side of the thermistor chip 30 formed electric connection with the first transmission circuit 21 and an opposite side to form electric connection with the second transmission circuit 22 via a COB (Chip On Board) fabrication process, and providing a transmission plate 40 so that the thermistor chip 30 can transfer heat via direct or indirect contact with the transmission plate 40. The COB fabrication process is a technique that can directly bond the thermistor chip 30 to the second transmission circuit 22 of the substrate 20, hence can be effectively implemented by converting the existing integrated circuit packaging process. However, the transmission plate 40 also can be directly formed by extending the first transmission circuit 21 or the second transmission circuit 22. Of course, the first transmission circuit 21 also can form electric connection with the thermistor chip 30 via the COB fabrication process; or by forming electric connection between one side of thermistor chip 30 and the second transmission circuit 22 first, then with the opposite side formed electric connection with the first transmission circuit 21 via the COB fabrication process. In addition, the method mentioned above also includes providing an isolation layer 50 with desired insulation characteristics through which the thermistor chip 30 can be interposed between the substrate 20 and the transmission plate 40. Of course, the isolation layer 50 also can have a positioning portion 51 to hold the thermistor chip 30.

What is claimed is:

1. A method for manufacturing a temperature measure unit of a thermometer to measure an object temperature and convert to an electric signal sent to a central processing unit located in the thermometer to be processed and converted to an information obtainable by users through an output unit located in the thermometer, the method comprising the steps of:

providing a substrate;

setting a first transmission circuit and a second transmission circuit, which is spaced apart from the first transmission circuit on the surfaces of the substrate;

providing a thermistor chip against the substrate and positioned thereon such that one side of the thermistor chip forms electric connection with the first transmission circuit and an opposite side thereof forms electric connection with the second transmission circuit;

providing a transmission plate, which has electric conductivity and thermal conductivity, for the thermistor chip to transfer heat and form electric connection with the second transmission circuit; and providing an isolation layer to allow the thermistor chip interposed between the substrate and the transmission plate, wherein the isolation layer includes a positioning portion to hold the thermistor chip and at least one aperture to allow the transmission plate and the first transmission circuit or the second transmission circuit to form electric connection.

2. The method of claim 1, wherein the substrate includes an end surface to form an electric signal identification code connection end by extending the first transmission circuit or the second transmission circuit to classify temperature measurement deviation values of the thermistor chip.

3. The method of claim 1, wherein the substrate includes an end surface to form an electric signal identification code connection end by extending the first transmission circuit or the second transmission circuit to classify temperature measurement deviation values of the thermistor chip.

* * * * *